March 16, 1965     F. KUGEL     3,173,260

FLUID COUPLING

Filed July 19, 1962     2 Sheets-Sheet 1

INVENTOR.
FRITZ KUGEL
BY

March 16, 1965  F. KUGEL  3,173,260
FLUID COUPLING
Filed July 19, 1962  2 Sheets-Sheet 2
Fig. 6
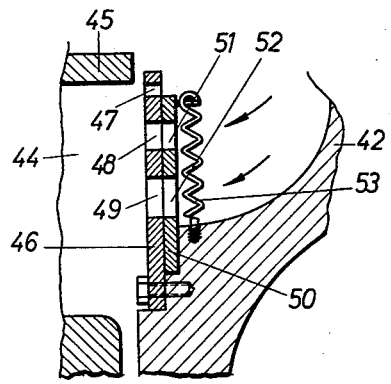
Fig. 7
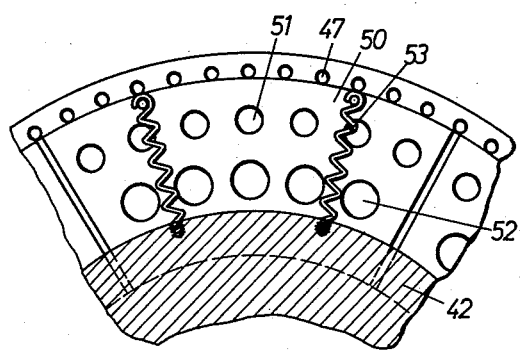
Fig. 8
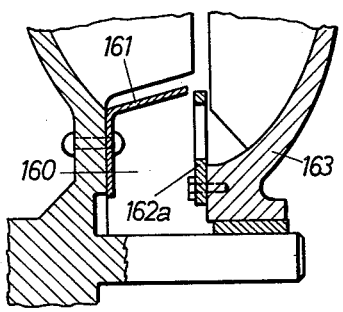
Fig. 9
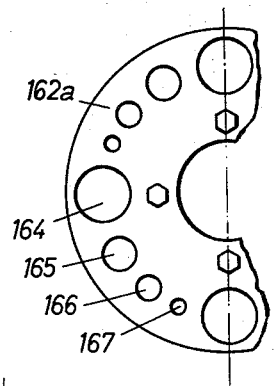
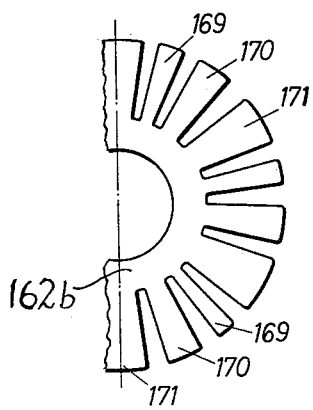
Fig. 10
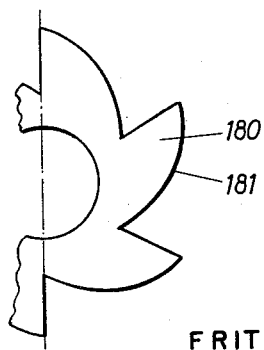
Fig. 11
INVENTOR.
FRITZ KUGEL
BY United States Patent Office 3,173,260
Patented Mar. 16, 1965

3,173,260
FLUID COUPLING
Fritz Kugel, Heidenheim, Germany, assignor to Voith-Getriebe KG., Heidenheim (Brenz), Germany
Filed July 19, 1962, Ser. No. 211,054
Claims priority, application Austria, July 22, 1961,
A 5,655/61; Dec. 12, 1961, A 9,371/61
9 Claims. (Cl. 60—54)

The present invention relates to fluid couplings. With power transmissions comprising a fluid coupling, it is frequently desirable, within the normal working range of the fluid coupling, to have therein as slight a slip as possible in order to obtain a maximum degree of efficiency, while within the range of high slip there should be as low a torque transmission as possible. Thus, for instance with vehicle drives, the torque conveyed by the fluid coupling should, with the vehicle at a standstill and the motor idling, be so low that the car will not have the tendency to roll. In particular, this requirement applies to fluid couplings with constant filling, i.e. to such couplings which operate without special fluid control operable from the outside. In such instances, it is intended that the transmitted torque will, at high slip up to complete braking fast of the output shaft (slip 100%), increase only slightly beyond the ordinary torque to be transmitted with a normal slip of from 2 to 3%, and will amount to a magnitude not higher than from 1.5 to 3 times said ordinary torque.

In an effort to solve this problem, in particular, two means have become known heretofore, viz. first, the arrangement of a baffle ring in the neighborhood of the axis of the coupling working chamber, which, with normal operational speeds, will not interfere with the circulatory flow because the latter, due to the high rotational speed about the coupling axis and in view of the high centrifugal pressure inherent thereto, will occur in the radially outer and medium range of the working chamber. At high slip, i.e. at low turbine wheel rotational speed, for instance when starting a vehicle, the radially outwardly directed centrifugal forces in the turbine wheel are, however, so low that the back flow from turbine wheel to pump wheel takes place in the radially innermost range of the working chamber and that then, in view of the baffle ring, the circulatory flow will be impeded so that also the transmitted torque will be only low.

The above-mentioned arrangement has the drawback that, depending on the size and arrangement of the baffle ring, either its torque reducing effect is too low at high slip, or the flow of the circulatory flow will also at low slip, even though to a slight extent, be noticeable in an undesired manner. Therefore, a second and, more specifically, a coreless coupling design has been suggested, i.e. without guiding walls built into the core ring chamber of the coupling, as has been illustrated in FIGURES 1 and 2. According to this arrangement, that portion of the working chamber which is located in the turbine wheel has a smaller inner diameter than that working chamber located in the pump wheel. Moreover, with this arrangement, a receiving chamber located at least to a considerable portion radially within the working chamber section formed by the pump wheel and separated from said working chamber section, communicates with said working chamber through openings facing said turbine wheel. At high slip, the circular flow passes from the turbine wheel into the receiving chamber and is there dammed up or retained, for which reason this chamber is also generally called a damming-up chamber. This results in a more or less partial emptying of the coupling working chamber and consequently in a corresponding reduction in the torque transmitting ability. The flow pertaining thereto has been illustrated in FIGURE 2 by the arrows 6. At ordinary low slip, however, the entire quantity of fluid circulates unimpededly in the working chamber according to the arrows 5 of FIGURE 1. This corresponds to the full transmitting ability of the coupling. This design thus meets the requirement for a sufficiently high torque reduction at high slip, and the requirement for an undisturbed flow and for a high degree of efficiency at normal operation with low slip.

In spite of the above-mentioned good properties, with the last-mentioned coupling, an unfavorable operational behavior has been encountered inasmuch as when shifting from low slip to high slip, the effect of the receiving or damming-up chamber becomes rather sudden and becomes immediately effective to such an extent that an undesirably high decrease in the torque in the medium range of medium slip values will result, as shown, for instance by the dotted curve 13 of FIGURE 3 (see lowering of the torque curve 13 between the slip values 5% and 30%). Such a decrease results in nonuniform acceleration and might result even in a stalling of the machine to be driven at certain speeds.

It is, therefore, an object of the present invention to overcome the above-mentioned drawbacks.

It is another object of this invention to provide a fluid coupling provided with a receiving or damming-up chamber, which will overcome the above-mentioned drawbacks.

These and other objects and advantages of the invention will appear more clearly from the following specification in connection with the accompanying drawings, in which:

FIGURES 6 and 7 represent a modification of the arrangement of FIGURES 4 and 5 wherein the perforations in the baffle wall are variable;

FIGURES 8 to 11 illustrate further modifications of the receiving or damming-up chamber, while at the partitions or baffle wall between damming-up chamber and working chamber, rotational asymmetrical passages, slots, notches, or other recesses are provided.

Figure 1:
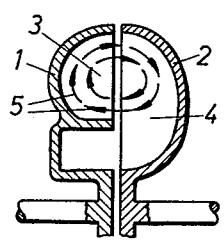
FIGURE 1 illustrates a coreless fluid coupling with a receiving or damming-up chamber and of the usual customary design with the fluid circulation indicated by arrows with small slip (FIGURE 1) or with high slip (FIGURE 2)

The fluid coupling according to the present invention is characterized primarily by certain additional features in the radial inner range of the coupling chamber accessible to working fluid. For instance, baffle rings or the like, may be provided in or near the damming-up chamber in such a way that when that portion of the annular flow which is directed toward the pump wheel is displaced from the intermediate diameter range of the working chamber into the range of the damming-up chamber—i.e. with increasing coupling slip—a choking or baffling of the annular flow will be obtained which increases only gradually with the displacement of the fluid flow.

According to one modification of the invention, one or more fluid choking inserts or baffles, preferably a baffle wall with perforations, are provided at that open side of the damming-up chamber which faces the turbine wheel. The damming-up chamber will, in conformity with the increasing slip, only gradually become effective.

A further modification according to the invention consists in that near the partition and radially outside and/or inside thereof, there are provided one or more flow choking inserts. These inserts may have an annular, preferably cylindrical shape, and are additionally provided with perforations for better controlling the effect of said inserts.

As has been mentioned above in the introductory portion of the specification, such inserts are known per se. However, they have heretofore been employed only in such a way that they alone produced the reduction of the torque transmitting ability, and therefore resulted in the above-mentioned drawbacks. With the present invention, however, the inserts are so designed that they will assure a gradual shift from operation with slight slip (totally unimpeded annular flow in working chamber) to operation with high slip (partial emptying of the working chamber into the damming-up chamber). In these circumstances, surprisingly, the initially mentioned drawbacks of the remaining baffle rings will, for all practical purpose, not be encountered.

A particularly advantageous embodiment according to the invention consists in that the partition and/or the additional inserts in different angular ranges comprise a radial outer confinement with varying distances from the axis. In view of this arrangement, that portion of the annular flow which is directed from the turbine wheel to the pump wheel will, when being displaced from the intermediate working chamber range into the radial inner range, first hit only in some angular ranges of the partition, i.e. when looking in circumferential direction, at some portions upon the partition or the additional inserts and only at those portions which have the largest diameter. Consequently, first, only in some angular ranges or sectors of the coupling a noticeable reduction in coupling is encountered, whereas in the intermediate sections, the annular flow in the working chamber remains substantially unchanged. Only when displacing the annular flow further inwardly toward the axis, also the remaining portions of the damming-up chamber which are located on the smaller diameters, or the parts of the additional inserts become effective until the partition portions will eventually, over their entire circumferential range and over their entire radial extent, become effective. This rotationally asymmetrical design of the partition and of the additional inserts thus represents a very effective means which will assure that when shifting from high to low slip, the reduction and throttling of the circular flow will increase only gradually and steadily, and that an undesired sudden drop in the torque within the range of the medium slip values, will be avoided. A similar effect may be obtained by providing the partition and/or the additional inserts with a plurality of openings such as bores, slots or the like, which may have a different cross-sectional magnitude and/or may be arranged at different distances. Sometimes, it is expedient, when the portions of the partition forming the condition of asymmetry and/or of the additional inserts, consist of a plurality of similarly designed sections uniformly distributed over the circumference. Moreover, in this connection, it is advantageous that each two of these sections are arranged opposite to each other with regard to the coupling axis and are centrally symmetrically arranged. With these designs, there will always be obtained an equalization of the mass and flow forces within the coupling, and furthermore, the manufacture will be facilitated. In order to make the rotational non-symmetry of the baffle or choke means and damming-up effect fully effective, it is furthermore suggested radially within the rotationally asymmetrically arranged partition or additional inserts, to provide additional radially directed partitions parallel to the axis of rotation of the machine. As a result thereof, an equalization of the flow is prevented, especially in circumferential direction, which could partially destroy the effect aimed at by the non-symmetrical arrangement.

It is also possible to make the partition and/or the inserts and/or the perforations adjustable, or to design the same so that they may, during operation of the machine, be adjusted at random or automatically in order in this way to obtain an optimum adaptation to the respectively prevailing conditions of operation.

By a corresponding arrangement and design of the partition and the above-mentioned inserts, and by correspondingly arranging and dimensioning the cross-section of said perforations, it will be possible, with the coupling according to the invention, to obtain with regard to the torque transmitting ability, not only a gradual transformation from normal operation to operation with filled damming-up chamber, but also any desired influencing of the torque within said range of transformation, without encountering the drawbacks of the heretofore known coupling designs. Thus, according to the present invention, it will be possible, from a certain slip on, to maintain the transmittable torque almost constant, as illustrated by the heavy torque line 14 in FIG. 3.

Figure 2:
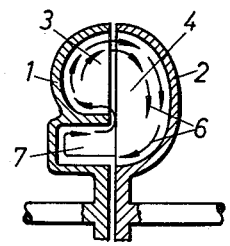

With the heretofore known coupling design as illustrated in FIGS. 1 and 2, the pump wheel 1 connected to the driving engine and the driven turbine wheel 2 confine the working chamber 3, 4 of the coupling. At low slip and ordinary or high speed, the circular flow in the working chamber takes the course indicated by the arrow 5 in FIG. 1, i.e. flows in that range of the working chamber which is located along the intermediate and large radii.

At high slip and low turbine wheel speed, however, the course of the coupling flow follows the arrow 6 according to FIG. 2 and thus passes into the damming-up chamber 7 which will fill from a certain magnitude of the slip on. In view of this partial emptying of the working chamber proper 3, 4, the coupling will have a strongly decreased torque transmitting ability.

Figure 3:
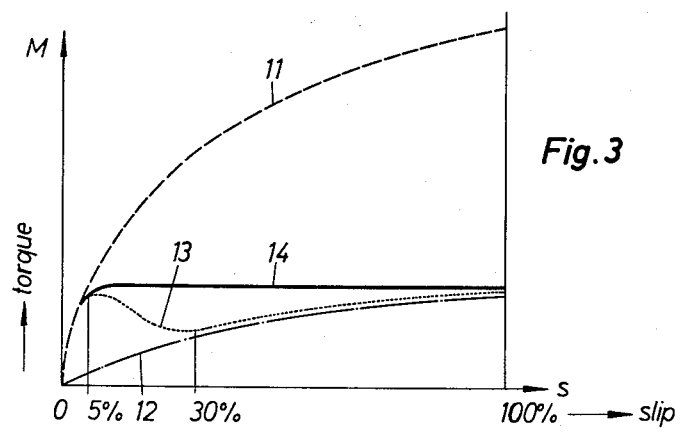
FIGURE 3 illustrates a diagram illustrating the course of the torque transmitted by fluid couplings of the old and new design, respectively, in conformity with the coupling slip.

FIG. 3 illustrates by way of a diagram the course of the coupling turbine torque plotted over the ordinate of the diagram with regard to the coupling slip plotted over the abscissa in percent. The dash line forming the highest (however, only theoretically highest) torque curve 11 applied to a coupling designed according to FIGS. 1 and 2 and for the instance in which the working chamber always remains filled, i.e. would not empty into the damming-up chamber 7. The lowest dot-dash curve 12 likewise has only theoretical meaning and applies to the instance in which the working chamber of the same coupling always has discharged to the greatest possible extent into the damming-up chamber which, of course, does likewise not occur in practice. Actually, with this heretofore known coupling, a torque course is obtained which follows the dotted line 13 which, at low slip, coincides with curve 11 and at high slip, coincides with curve 12 in conformity with the then actually occurring maximum or minimum filling of the working chamber. Within the intermediate range of operation, for instance, between the slip values of 5% and 30%, a rather steep step or merging portion appears between the curves 11 and 12 in such a way that the transmitted coupling torque will, with increasing slip, suddenly drop and, for instance, will only again increase when the slip increases in excess of 30%. This step of the actual torque curve 13 is, for the above-mentioned reasons, rather undesirable and may in some instances even be dangerous and, therefore, is to be avoided. This has been accomplished by the present invention. Due to the fact that with the damming-up chamber-couplings according to the present invention, the transition from operation with totally emptied damming-up chamber (slight slip) to the operation with completely filled damming-up chamber (maximum slip) is effected only with gradually increasing choking or baffling of the annular flow and then extends over a wide slip range, for instance from the slip value 5% to the range of high slip, the sudden torque drop will be avoided and the actually transmitted coupling torque will then follow the course of the heavy line 14. By correspondingly modifying the design according to the invention, the actual torque course may be varied in many ways.

Figure 4:
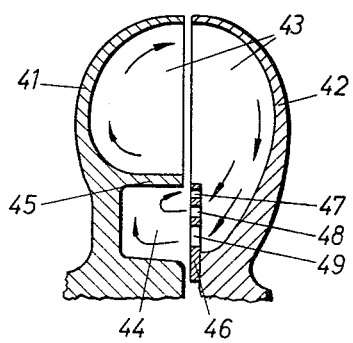
FIGURES 4 and 5 illustrate an embodiment of a fluid coupling according to the invention, in which the receiving or damming-up chamber is at that open end face which faces the turbine wheel, confined by a perforated disc or baffle wall.
Figure 5:
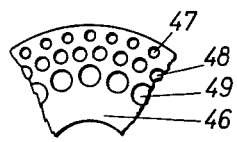

FIGS. 4 and 5 illustrate an embodiment of a fluid coupling according to the present invention. The pump wheel 41 and turbine wheel 42 confine the working chamber 43, and the damming-up chamber 44 is by means of a partition 45, confined with regard to the radially outward direction. Between the chamber 44 and the turbine wheel there is provided a baffle wall 46 which in this instance is connected to the turbine wheel but may also, instead, be connected to the pump wheel. This baffle wall 46 has, for instance, three rows of bores 47, 48, 49 (see in particular FIG. 6) which are arranged concentrically with regard to the coupling axis and which, in view of their arrangement and size in the range near the axis, yield a greater passage cross-section than in that range which is remote from the axis. In this way, it will be assured that the effect of the damming-up chamber will start at the intermediate slip (at about 5% slip according to FIG. 3), but will only gradually increase, and that only at very high slip will the damming-up chamber be fully effective.

A modification of the design just described is illustrated in FIGS. 6 and 7. FIG. 6 shows on an enlarged scale a portion of the turbine wheel 42 and the baffle choke wall 46 with the perforations 47–49. Directly adjacent the baffle wall 46 there is provided a plurality of annular segments 50 (see FIG. 7) which are uniformly distributed over the circumference and which, under the effect of centrifugal force, are radially outwardly displaceable against the thrust of springs 53. At low turbine rotational speed and consequently at low centrifugal force and with the innermost location of the segments 50, the bores 51, 52 thereof register with the bores 48, 49 of the baffle wall. Moreover, than, also, the openings 47 will be free so that the control chamber 44 will be able fully to become effective. With increasing turbine wheel speed, however, the outwardly sliding segments 50 will more and more cover bores 47 to 49 of the baffle wall and, consequently, will make the damming-up chamber ineffective to an increasing extent. In this way, in the most difficult case of application, an additional adaptation to the respective requirements of operation, may be obtained. Similarly, an adjustment of the flow passages between the damming-up chamber and the working chamber in the other modifications can be had.

FIGS. 8 to 11 illustrate modifications according to which the damming-up chamber 160 proper and its radial outer wall or partition 161 are symmetrical with regard to their axis of rotation. The rotational non-symmetry will in this instance be brought about by baffle rings having orifices therein which are non-symmetrically arranged with regard to the axis of rotation at the inlet to the damming-up chamber. Also baffle rings having a notched or slotted periphery can be employed. According to FIGS. 8 and 9, baffle ring is designed as a ring 162a connected to the turbine wheel 163. This ring 162a is provided with perforations 164, 167 located approximately on the same diameter but of different size. According to FIG. 10, the ring 162b may, instead of being provided with holes, be provided with serrations or radial slots defining tooth-like webs 169 to 171 of different widths. According to FIG. 11, the baffle ring may be composed of a plurality of segments 180 the outer contour of which is of a spiral shape. Also in this way the desired non-symmetry with regard to the damming-up effect may be obtained.

It is, of course, to be understood that the present invention is, by no means, limited to the particular constructions shown in the drawings but also comprises any modifications within the scope of the appended claims.

What I claim is:

1. In combination in a fluid coupling: a bladed pump wheel and a bladed turbine wheel confining with each other an annular working chamber operable when the wheels are rotating for subjecting a fluid therein to a circulatory torque transmitting flow and the core area of said working chamber providing for substantially unimpeded circular flow of the fluid in any of the possible coupling slip conditions, the radially inner edge of that part of the working chamber which is located within the pump wheel being disposed farther from the axis of rotation of the coupling than the radially inner edge of that part of the working chamber which is located within the turbine wheel, an annular fluid receiving chamber in the pump wheel located radially inwardly of said inner edge of the working chamber part located in the pump wheel and having an open end face facing that portion of the working chamber part in the turbine wheel which is positioned radially inwardly from said inner edge of the working chamber part in said pump wheel, said pump wheel having first wall means located between and separating said receiving chamber from said last mentioned working chamber part in said pump wheel, second wall means interposed between said open end face of the receiving chamber and said portion of the working chamber part in the turbine wheel, said second wall means being provided with perforations providing communication between said receiving chamber and said portion of the working chamber part in the turbine wheel.

2. A fluid coupling according to claim 1, in which said second wall means are connected to said turbine wheel.

3. A fluid coupling according to claim 1, in which there is provided a small annular gap between the ends of said first wall means and said second wall means which are adjacent each other.

4. A fluid coupling according to claim 1, wherein said second wall means is arranged substantially perpendicular to the axis of rotation of the coupling.

5. A fluid coupling according to claim 1, in which the effective cross sectional area of said perforations is varied in conformity with the condition of operation of said coupling.

6. A fluid coupling according to claim 1, in which said perforations consist of at least one row of holes arranged concentrically with regard to the axis of rotation of the coupling.

7. A fluid coupling according to claim 1, in which there are provided at least two rows of holes arranged concentrically with regard to the axis of rotation of said coupling and with respectively different radial spacings from said axis, the perforations in the row located at the larger radial distance from the axis of the coupling due to their number and size furnishing a smaller total cross sectional passage area than is provided by the perforations in the row located at the smaller radial distance from the axis of rotation of said coupling.

8. A fluid coupling according to claim 1, which includes a plurality of similar groups of perforations uniformly distributed over the circumference of said second wall means.

9. A fluid coupling according to claim 1, in which said second wall means consists of a plurality of identically designed uniformly circumferentially distributed segments.

References Cited in the file of this patent
UNITED STATES PATENTS

| | | |
|---|---|---|
| 2,074,346 | Sinclair | Mar. 23, 1937 |
| 2,299,883 | Dunn | Oct. 27, 1942 |
| 2,301,645 | Sinclair | Nov. 10, 1942 |
| 2,466,356 | Becker | Apr. 5, 1949 |
| 2,487,250 | La Boie | Nov. 8, 1949 |
| 2,875,581 | Kugel | Mar. 3, 1959 |
| 3,023,582 | Ryan | Mar. 6, 1962 |

FOREIGN PATENTS

| | | |
|---|---|---|
| 692,286 | Great Britain | June 3, 1953 |